G. B. FRALEY.
ELECTRIC BATTERY.
APPLICATION FILED MAY 28, 1918.

1,334,849.

Patented Mar. 23, 1920.
2 SHEETS—SHEET 1.

Witnesses

Inventor
George B. Fraley,
By
Attorney

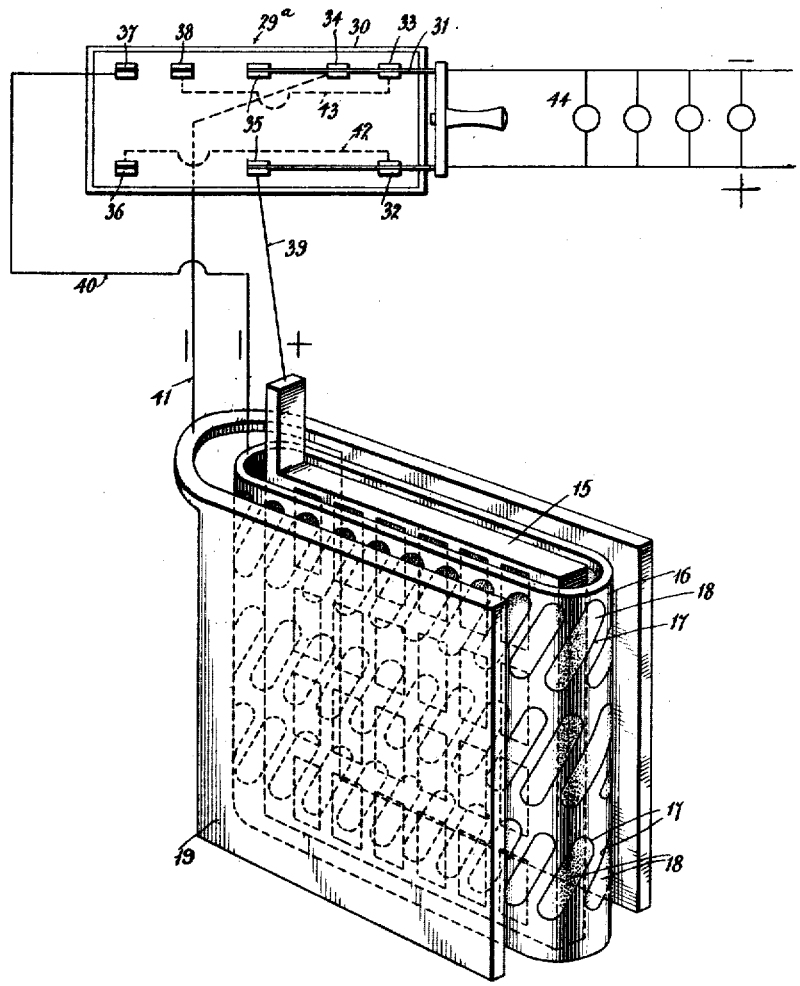

UNITED STATES PATENT OFFICE.

GEORGE B. FRALEY, OF DEBRUCE, NEW YORK.

ELECTRIC BATTERY.

1,334,849.  Specification of Letters Patent.  Patented Mar. 23, 1920.

Application filed May 28, 1918. Serial No. 237,035.

*To all whom it may concern:*

Be it known that I, GEORGE B. FRALEY, a citizen of the United States, residing at Debruce, in the county of Sullivan and State of New York, have invented new and useful Improvements in Electric Batteries, of which the following is a specification.

This invention relates to electric batteries and particularly to a class thereof that may be termed a dual storage or secondary and primary battery embodied in one organization. The main object of the invention is to provide a battery comprising a negative storage receptacle and other coördinating components adapted to be charged and to retain a charge until utilized, and also equipped with means for instantly converting it into a primary battery when the stored charge has become exhausted, thereby increasing the utility of the storage or secondary batteries and rendering them practically serviceable or electrically active as generators at intervals between storage exhaust and re-charge thereof. Other objects and advantages will hereinafter appear and the invention consists in the construction and arrangement of the several parts which will be more fully hereinafter described and claimed.

In the drawing:—

Fig. 3 is a slightly modified form of the battery embodying a plate organization and involving the same principle as the battery cell shown by Figs. 1 and 2.

Figure 1:
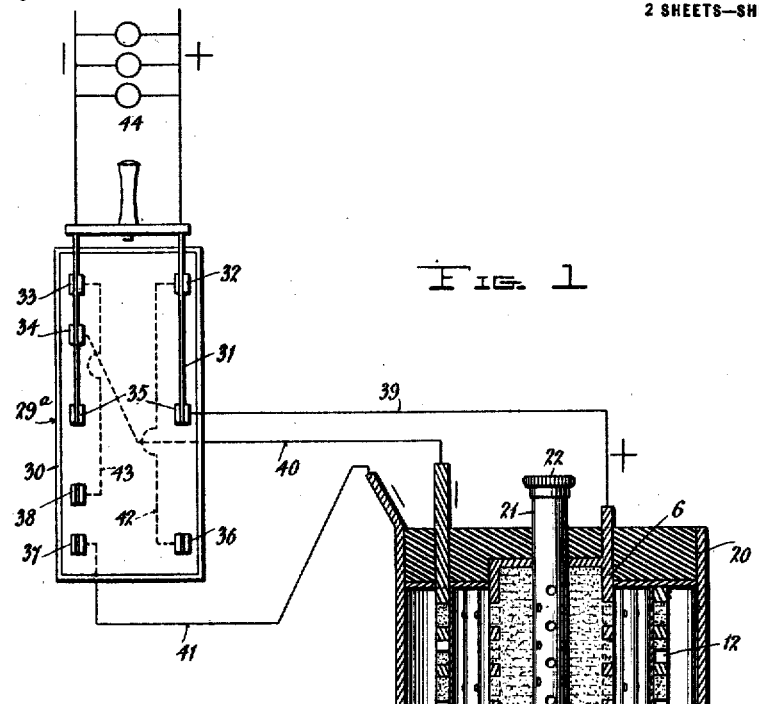
Figure 1 is a transverse vertical section of a battery cell embodying the features of the invention and showing a controlling switch attachment and local circuit in connection therewith.
Figure 2:
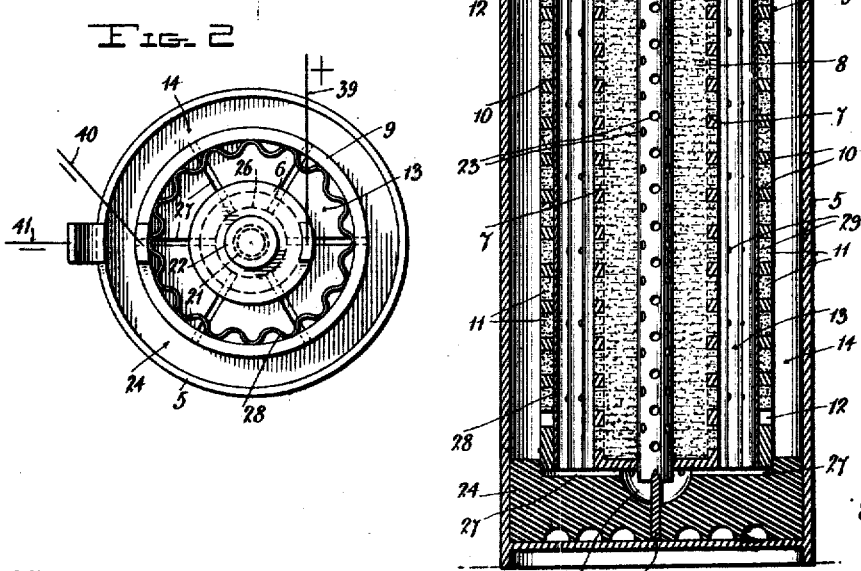
Fig. 2 is a top plan view of the improved battery cell.

Referring to Figs. 1 and 2, the numeral 5 designates a retaining cell preferably formed of zinc and having therein a negative storage receptacle 6 with perforations 7 in the wall thereof, suitable active material 8 being placed in the said receptacle and exposed through the perforations 7. Surrounding the negative storage receptacle 6 is a positive storage cylinder 9 which is also formed with perforations 10 in which a suitable active material 11 is disposed. The cylinder 9 is also formed with vents 12 at different elevations therein for obvious reasons and as will be readily understood by those skilled in this particular art. It will be observed that in this battery there are two separate positive elements, the zinc receptacle or retaining cell 5 acting as a primary, and the storage cylinder 9 acting as a secondary. The terminals are marked plus and minus, as shown, respectively, to indicate positive and negative terminals, but it will be understood that the element marked plus is really the negative element of the battery and the ones marked minus are the positive elements of the battery. In the spaces 13 and 14 respectively between the negative storage receptacle 6 and the cylinder 9 and between the said cylinder and the zinc retaining cell 5, a suitable electrolyte is introduced, said spaces being filled with the electrolyte, and the latter may be either a semi-dry substance or a gelatin mass.

In the form of the battery as shown by Fig. 3, the negative element 15 of suitable material is inclosed in a perforated zinc element 16 having oblong openings or slots 17 which are filled with a suitable active material 18, and around the zinc element 16 a U-shaped positive element 19 is applied, said positive element being of the regular form adopted in storage batteries. In this modified form of battery also there are two separate positive elements or the oblong zinc element or inclosure 16 and the outer element 19.

Reverting to the battery shown by Fig. 1, the space 20 at the top thereof will be sealed or provided with the usual wax seal. In the center of the battery cell as shown by Fig. 1 is a hard rubber tube 21 having a removable cap 22, said tube having a series of perforations, as at 23, which may be continued throughout the length thereof. When the moisture of the electrolyte fillings becomes exhausted, the tube 21 may be easily utilized for remoistening the fillings by simply removing the cap 22 which will also serve as a gas vent.

Within the bottom of the cell as shown by Fig. 1 is a hard rubber cross support 24 on which the lower ends of the negative storage receptacle 6 and the cylinder 9 have bearing, the lower end of the tube 21 projecting through the bottom of the negative storage receptacle 6 and supported by cross member 25 of the support 24 within a space 26 with which grooves 27 in the upper surface of the hard rubber support 24 have communication and also with the outer space 14 between the retaining cell 5 and the cylinder 9 and whereby the moisture introduced into the cell may be readily transmitted not only to the outer space 14 but also to the intermediate space 13. To hold the cylinder 9 in proper spaced and centered relation to the negative storage receptacle 6, a corrugated cylinder 28 is used and this space cylinder is perforated, as at 29, to permit the electrolyte to pass therethrough.

A switch 29ª is connected to the elements of the improved battery in both forms of the latter in practically the same manner or so that the two forms of batteries shown by Figs. 1 and 2 and Fig. 3 may be similarly operated or carry out the purpose of the improvement in the two forms of battery elements. The switch 29 embodies a base 30 on which is movably mounted a double-pole throw switch member 31 adapted to engage a plurality of contacts indicated by the reference characters, 32, 33 and 34, all located on one side of center contacts 35, and on the opposite side of the said center contacts are similar contacts 36, 37 and 38. The negative storage receptacle is connected by a wire 39 to the contacts 35 which form one of the hinging points for the switch member 31, and the positive storage cylinder 9 and the zinc retaining cell 5 are respectively connected by wires 30 and 41 with the contacts 34 and 37. The contacts 32 and 36 and 33 and 38 are connected to each other in distinct pairs by under-wire connections 42 and 43. In connection with the switch 29, a local circuit 44 is shown for illustrating the operation of the improved battery.

The battery cell in either of its forms after assemblage of the elements or components thereof will be charged in the conventional manner and the switch member 31 will be thrown over, as shown, to engage the contacts 32, 33 and 34, and as soon as the stored charge becomes exhausted, the switch member 31 may be adjusted or thrown over to connect the primary or positive element and the negative element or storage receptacle 6, thus immediately converting the battery into a primary one which will make current available for several hours or until a charging station is reached when the storage elements can be re-charged by disposing the switch member 31 in the position shown in the drawing. By means of this improved battery, the life of the primary element is greatly prolonged, as it does not come under the influence of the charging current and also provides means for prolonging the life of the battery particularly when the same is made up in the form of what is generally known as dry batteries.

The improved battery will be found materially advantageous in general battery service and especially in connection with automobiles or where a prolongation of the electrical activity of a storage or secondary battery may be desirable after the latter has become exhausted, and especially when such exhaustion takes place at a distance from a charging station or means.

The plates and cylinders hereinbefore referred to and used as the storage elements will be preferably lead or nickel, and the active material used will be litharge such as generally used in lead batteries, this material being applied to both the positive and negative storage elements, the active material being converted into dioxid of lead when the battery is charged and discharged. The electrolyte may be either caustic soda, sulfate or zinc and salamoniac, or, diluted sulfuric acid.

What I claim is:—

1. A battery of the class specified, comprising two separate positive elements acting as a primary, a storage element acting as a secondary, and means electrically connected to the said elements and provided with a shiftable device to render the battery actively serviceable subsequent to exhaust of the stored charge thereof by converting it into a primary battery.

2. A battery of the class specified, an intermediate storage element acting as a secondary, two independent negative elements of the same material, an electrolyte common to the said elements, and electrical connections for instantly converting the battery into a primary battery when the stored charge thereof has become exhausted.

3. A battery of the class specified, a storage element acting as a secondary, two zinc plates associated with and independent of one another and of the storage element, an electrolyte common to the said plates and storage element and electrical connections for the plates and storage element for converting the battery into a primary battery when the stored charge is exhausted.

In testimony whereof I have hereunto set my hand in presence of two subscribing witnesses.

GEORGE B. FRALEY.

Witnesses:
  WILLIAM B. HAND,
  VERA INTEMANN.